July 11, 1933.   P. S. EDWARDS ET AL   1,917,244
ELECTRICAL INSTRUMENT
Filed Sept. 19, 1929
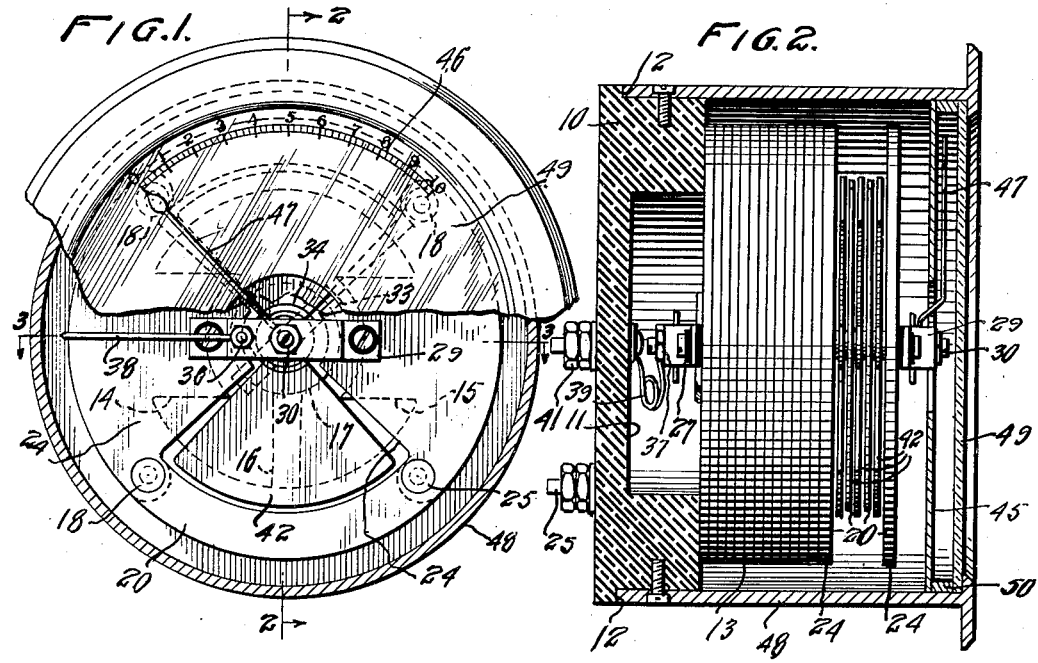
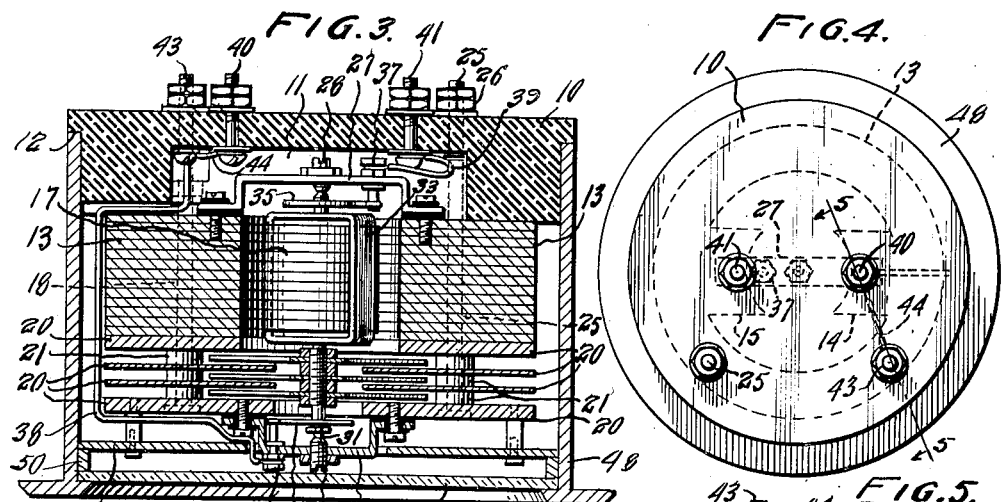
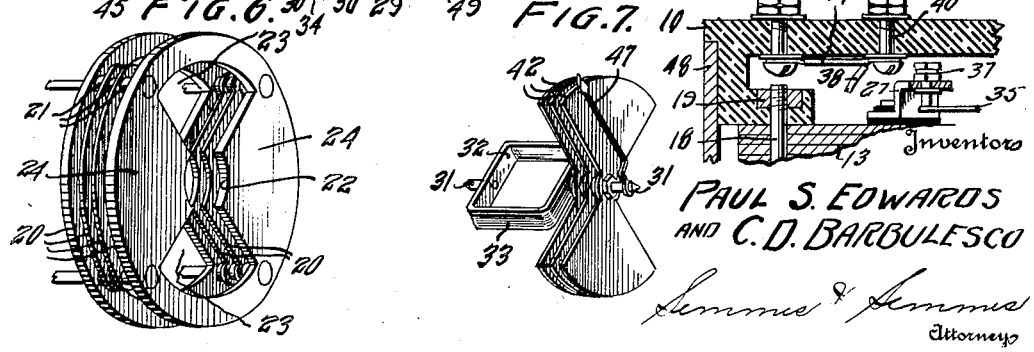
Inventors
PAUL S. EDWARDS
AND C. D. BARBULESCO
Attorneys Patented July 11, 1933

1,917,244

UNITED STATES PATENT OFFICE

PAUL S. EDWARDS, OF FORT KNOX, KENTUCKY, AND CONSTANTIN D. BARBULESCO, OF OAKWOOD, OHIO

ELECTRICAL INSTRUMENT

Application filed September 19, 1929. Serial No. 393,811.

(GRANTED UNDER THE ACT OF MARCH 3, 1883, AS AMENDED APRIL 30, 1928; 370 O. G. 757)

The invention described herein, if patented, may be manufactured and used by or for the Government for governmental purposes, without the payment to us of any royalty thereon.

This invention relates to electrical instruments and more particularly to instruments having means for measuring electrical values combined with means for establishing values of electrical capacitances.

An object of the invention is to provide an electrical instrument having relatively movable parts adapted to measure electrical current and to produce variations of capacitance as a result of the variation of the current.

Another object of the invention is to provide an electrical instrument having relatively movable instrumentalities, one of which is responsive to electrical current impressed thereon and another coacting with the responsive instrumentality to simultaneously establish corresponding values of capacitance dependent upon the electrical factors entering into the determination of electrical capacitance between insulated bodies.

A still-further object of our invention is to provide an electrical instrument adapted to measure electrical current and simultaneously produce variations of the capacitance as a result of the variation of the current, an instrument which is positive in action, highly efficient in operation and yet of marked simplicity as a whole and in respect of each of its component parts, so that its manufacture may be economically facilitated both as to parts and their assembly.

Further objects and advantages of the invention reside in the various combinations hereinafter described and claimed, as will be apparent upon reference to the following specifications and to the accompanying drawing, in which:

Figure 1 is a top plan view partly broken away and partly in section,

Figure 2 is a sectional view substantially on line 2—2 of Figure 1,

Figure 3 is a sectional view substantially on line 3—3 of Figure 1,

Figure 4 is a bottom plan view,

Figure 5 is an enlarged detailed view,

Figure 6 is a perspective view of the stator plates, and

Figure 7 is a perspective view of the rotor plates.

Referring to the drawing for more specific details of the invention, 10 represents a suitable base preferably of hard rubber or bakelite. As shown, the base is provided with an axial bore or recess 11 and a circumferential shoulder 12, the object of which will hereinafter appear. Positioned on the base is a magnet 13 preferably of laminated metal. The magnet is formed with a plurality of superimposed annular plates having on the inner perimeter thereof diametrically disposed poles 14 and 15 provided with oppositely arranged arcuate faces and an arm 16 supporting a core 17 concentric to the arcuate faces of the poles.

The magnet is secured in position by a plurality of studs 18 threaded into nuts 19 imbedded in the base, and positioned on the studs 18 are stator plates 20 retained in spaced relation by suitable spaces 21. As shown, the upper and lower stator plates are each formed by a disk having an axial bore 22 and openings 23 providing diametrically disposed segmental portions 24. The intermediate stator plates are of the same general contour as the portions 24, and a bolt 25 passes through the stator plates, the magnet and the base is secured in position by nuts 26 to provide a suitable terminal for the plates.

A strap or bracket 27 is secured to the magnet within the recess 11. This bracket is suitably insulated from the magnet and has mounted thereon an adjustable bearing 28 positioned in the axis of the core 17. A similar bracket 29 is suitably secured to and insulated from the top stator plate and mounted thereon is an adjustable bearing 30 also in the axis of the core 17.

A divided shaft 31 having an interposed insulated frame 32 is mounted for rotation in the bearings 28 and 30 and a suitable coil 33 is positioned on the frame in the magnetic field between the poles and core. The coil comprises a number of turns of wire wound on the frame and the terminals thereof are secured to the respective end portions of the shaft, which are connected through delicate coil springs 34 and 35 to suitable binding posts 36 and 37 positioned respectively on the brackets 27 and 29. The springs 34 and 35 serve to balance the shafts 31. The binding posts 36 and 37 are connected by leads 38 and 39 to terminals 40 and 41 mounted in the base and adapted to be connected to a suitable source of electrical power supply.

Secured on the shaft 31 above the frame 32 are a plurality of rotor plates 42. As shown, the rotor plates 42 comprise oppositely disposed segmental plates adapted to interleaf the stator plate 20. The terminal for the rotor comprises a binding post 43 mounted on the base and connected by a lead 44 to the binding post 40 which is connected to the coil spring 34, the binding posts 36 and the lead 38 to the shaft 31 upon which the rotor plates are mounted.

Supported on the top stator plate is a face plate 45 having a calibrated scale 46 on which may be indicated degrees of electrical values, and a pointer 47 secured on the shaft 31 is adapted to move through its range over the calibrated scale.

A casing 48 is provided for the instrument. This casing is mounted on the circumferential shoulder 12 on the base 10 and is provided with a glass cover 49 suitably secured in place by a sleeve 50 fitted snugly in the casing and bearing against the glass.

When a source of electrical current is connected to the terminals of the coil and current is introduced, the coil is acted upon by forces which turn it through an angle and this angle may be read on the calibrated scale over which the pointer moves through its range to indicate the value of electrical current supplied. Simultaneously with the movement of the pointer, there is a relative movement between the stator and rotor plates, which varies the capacitance to a value corresponding to the value of the current supplied to the coil.

Although this invention has been described in connection with certain specific embodiments, the principles involved are susceptible of numerous other applications that will readily occur to a person skilled in the art. The invention is, therefore, to be limited only as such limitations are clearly imposed by the appended claims.

Having thus described the various features of the invention, what we claim as new and desire to secure by Letters Patent, is:—

1. An electrical instrument comprising a base, a magnet having diametrically disposed poles provided with arcuate faces, studs for securing said magnet to the base, a core positioned concentric to the arcuate faces of the magnet, a frame mounted for rotation between the arcuate faces of the poles and the core, a coil wound upon the frame adapted to be affected by an electrical change, a pointer movable with the frame to indicate the electrical change, a scale cooperating with the pointer, a condenser comprising rotor plates movable with the frame and stator plates carried by said studs cooperating with the rotor plates to vary the capacitance corresponding to the value of electrical change.

2. An electrical instrument comprising a base, a magnet having diametrically arranged poles, studs for securing said magnet to the base, a core positioned concentric to the poles, a frame having stub shafts journaled to position the frame for rotation between the poles and the core, a coil wound upon the frame with its terminals connected to the respective shafts adapted to be affected by an electrical change, means for balancing the frame, a pointer on one of the stub shafts to indicate the electrical change, a scale cooperating with the pointer, a condenser comprising a plurality of rotor plates movable with the frame and a plurality of stator plates carried by said studs cooperating with the rotor plates to vary the capacitance corresponding to the value of electrical change.

3. An electrical instrument comprising a base, a magnet, studs for securing said magnet to the base, a core positioned concentric to the poles of the magnet, a stack of stator plates positioned on the magnet and carried by said studs, a frame mounted for rotation between the core and the poles of the magnet, a coil wound upon the frame adapted to be affected by an electrical change, means for balancing the frame, a pointer carried by the frame to indicate the electrical change, a calibrated scale cooperating with the pointer and a stack of rotor plates carried by the frame adapted for cooperating with the rotor plates to vary the capacitance corresponding to the value of electrical change.

4. An electrical instrument comprising a base, a magnet, studs for securing said magnet to the base, a core positioned concentric to the poles of the magnet, a frame mounted for rotation between the core and the poles of the magnet, shafts for supporting the frame, a coil wound upon the frame having its terminals secured to the respective shafts adapted to be affected by an electrical change, coil springs connecting the shafts to the terminals, a pointer secured to one of the shafts to indicate the electrical change, a scale cooperating with the pointer, a condenser comprising diametrically arranged stacks of stator plates on the magnet and carried by said studs and diametrically arranged stacks of rotor plates on one of the shafts for cooperation with the stator plates to vary the capacitance corresponding to the value of electrical change.

In testimony whereof we affix our signatures.

PAUL S. EDWARDS.
CONSTANTIN D. BARBULESCO.